United States Patent [19]
Morioka

[11] Patent Number: 6,009,094
[45] Date of Patent: Dec. 28, 1999

[54] SCHEME FOR DATA TRANSFER AMONG DATA COMMUNICATION DEVICES USING DATA PACKET ORDER CONTROL

[75] Inventor: Yasuhiro Morioka, Hyogo, Japan

[73] Assignee: Kabushiki Kaisha Toshiba, Kawasaki, Japan

[21] Appl. No.: 08/827,311

[22] Filed: Mar. 26, 1997

[30] Foreign Application Priority Data

Mar. 26, 1996 [JP] Japan .................................. 8-069578

[51] Int. Cl.$^6$ .................................................. H04L 12/28
[52] U.S. Cl. .......................................... 370/394; 370/428
[58] Field of Search .................................... 370/389, 392, 370/394, 400, 428, 516, 517, 230, 229, 231, 235

[56] References Cited

U.S. PATENT DOCUMENTS

| | | | |
|---|---|---|---|
| 4,617,657 | 10/1986 | Drynan et al. | 370/394 |
| 4,727,537 | 2/1988 | Nichols | 370/389 |
| 5,381,408 | 1/1995 | Brent et al. | 370/517 |
| 5,530,902 | 6/1996 | McRoberts et al. | 370/389 |
| 5,623,605 | 4/1997 | Keshav et al. | 395/200.17 |
| 5,633,865 | 5/1997 | Short | 370/412 |
| 5,701,090 | 12/1997 | Hidaka et al. | 326/87 |

OTHER PUBLICATIONS

A. S. Tanenbaum et al., "Parallel Programming Using Shared Objects and Broadcasting", Dept. of Mathematics and Computer Sciences, Vrije Universiteit, The Netherlands, (1992), pp. 1–19.

T. Crowley et al., "MMConf: An Infrastructure for Building Shared Multimedia Applications", Oct. (1990), pp. 329–341.

*Primary Examiner*—Hassan Kizou
*Assistant Examiner*—Daniel Previl
*Attorney, Agent, or Firm*—Foley & Lardner

[57] ABSTRACT

A scheme for data transfer among data communication devices on a network which is capable of reducing a cost required for maintaining the data packet order. Uniquely defined consecutive packet numbers are generated at one data communication device among those data communication devices which are in communication state, and a packet number for each data packet to be transmitted at each data communication device is obtained from that one data communication device. Then, each data packet is transmitted at each data communication device by attaching a corresponding packet number to each data packet. On the other hand, data packets are received at each data communication device, and received data packets are processed at each data communication device in an order of packet numbers attached to the received data packets.

20 Claims, 9 Drawing Sheets

SCHEME FOR DATA TRANSFER AMONG DATA COMMUNICATION DEVICES USING DATA PACKET ORDER CONTROL

BACKGROUND OF THE INVENTION

1. Field of the Invention

The present invention relates to a scheme for data transfer among data communication devices which are interconnected through a network.

2. Description of the Background Art

In the data exchange among data communication devices which are interconnected through a network, some data exchanges are strongly dependent on an arrival order of data to be exchanged, and there are cases in which it is required to uniquely specify an order of exchanges among a plurality of data communication devices.

For example, consider a case of a network system as shown in FIG. 1 which is formed by three data communication devices A, B and C interconnected through a network. In this network system of FIG. 1, the data communication devices A, B and C have data of identical contents which are copied at each device, and an updating of data is realized by rewriting data at one device and notifying entered modifications to other devices so that each of the other devices updates the own data according to the notified modifications. In this manner, the data contents owned by the data communication devices A, B and C are maintained consistently.

This scheme is widely used because an amount of data to be exchanged is rather small. FIGS. 2A and 2B illustrates this scheme. Namely, an event X: "write a circle" made by one user at the device A is transmitted to the other devices B and C as shown in FIG. 2A, so that data owned by all the devices A, B and C are updated as shown in FIG. 2B.

However, this data updating is carried out simultaneously in parallel at each data communication device so that if the updating is not carried out in a unique time order, that is, if the arrival order of packets indicating the modifications are different at different devices, the data contents owned by different devices may turn out to be different as illustrated in FIGS. 3A and 3B.

Namely, in FIG. 3A, an event Y: "move a region enclosing a circle" at the device A and an event Z: "write a cross on a current position of a circle" at the device B are simultaneously made and transmitted to the respective other devices. When the data representing these events are straightforwardly processed in their arrival order, since the locally received event arrives first, the arrival orders at the devices A, B and C are:

Event Y, Event Z at the device A,

Event Z, Event Y at the device B, and

Event Z, Event Y at the device C, for example, and therefore if these events are processed in such an arrival order at each device, the data at the device A would be different from the data at the device B and the device C as shown in FIG. 3B.

On the other hand, a method for updating the own data at each device can be largely classified into the following three types:

(i) a method for updating the own data first, and then transmitting modifications to the others (without confirming the transmission completion);

(ii) a method for updating the own data first, and then transmitting modifications to the others. If the transmission completion is not confirmed, the own data is restored; and (iii) a method for transmitting modifications to the others first, and then the own data is updated when the transmission completion is confirmed.

In the method (i), the data updating and the modifications transmission at the own device are given a priority, and states of the other devices are ignored.

In the method (ii), the data updating and the modifications transmission at the own device are given a higher priority, but invalidated when the other devices failed to receive the modifications.

In the method (iii), the updating becomes possible only after the receiving of the modifications by the other devices is confirmed, so that data arrives at every device, although the data arrival order is not certain. The examples illustrated in FIGS. 2A, 2B, 3A and 3B are based on the method (i), but even when the method (ii) or the method (iii) is employed, the similar situation as described above can happen.

As a scheme for preventing such a difference in data among a plurality of devices and maintaining the arrival order uniquely, various schemes have been proposed and utilized, including the following:

(I) a scheme for synchronizing time among the data communication devices and transmitting a data packet by attaching a transmission time thereto so that each data packet becomes unique in time;

(II) a scheme in which a data packet is transmitted from each data communication device to a server once, and then data packets are ordered at the server and transmitted from the server to the data communication devices, so as to maintain the uniqueness;

(III) a scheme in which a token is issued at each data communication device, and sequentially moved to another device at a constant time interval. Each data communication device can transmit a data packet only while it possesses the token, so as to maintain the uniqueness.

The scheme (I) is associated with the problems of: (1) how to synchronize time; and (2) how to handle data packets which are transmitted at the identical time by a plurality of different data communication devices (even when these data packets are transmitted at not exactly the same time, this situation also occurs if there is a delay in the actual transmission timing due to the re-transmission, etc.

The scheme (II) is associated with the following problems. (1) In view of the processing load on the server, the server is required to have a superior processing power than the data communication devices. (2) In a straightforward comparison with a case of transmission from a source device to the other devices, it is necessary to use a transmission path which is twice as long, and this straightforwardly implies that traffic becomes twice as large. (3) Information concerning the data packet order is centrally managed by the server, so that there is a need to provide a measure (such as saving of data managed by the server) for dealing with a trouble in anticipation of an accident such as a sudden loss of the server.

The scheme (III) is associated with the problems of: (1) a recovery processing in a case of token loss; and (2) an increase of communication cost due to communications for token exchange.

As a scheme for resolving these problems of these conventionally known schemes, the present inventor has previously proposed a scheme in which one device regularly transmits an information on an order of packets received at that device to the other devices, and these other devices rearrange the processing order for the respective received packets according to this packet order information before processing the packets, as disclosed in Japanese Patent Application No. 7-321871 (1995). However, according to this scheme, the received packet cannot be processed until the packet order information is obtained, so that it is necessary to obtain the packet order information even in an ordinary state in which the packet order variation is small. Consequently, although it is possible to deal with a sudden packet order variation by the handling similar to that in an ordinary state, it in turn causes the lowering of a response in an ordinary state.

Thus, the prior art schemes for maintaining the data packet order uniquely have been associated with various problems such as an increase of communication cost or response delay in an ordinary state, or a centralized processing load and a high cost required at a time of recovery from a trouble as a result of the centralized processing load.

SUMMARY OF THE INVENTION

It is therefore an object of the present invention to provide a scheme for data transfer among data communication devices on a network which is capable of reducing a cost required for maintaining the data packet order.

According to one aspect of the present invention there is provided a method for transferring data in forms of data packets among a plurality of data communication devices interconnected through a network, comprising the steps of: generating uniquely defined consecutive packet numbers at one data communication device among those data communication devices which are in communication state; obtaining a packet number for each data packet to be transmitted at each data communication device, from said one data communication device; transmitting each data packet at each data communication device by attaching a corresponding packet number obtained at the obtaining step to each data packet; receiving data packets at each data communication device; and processing received data packets at each data communication device in an order of packet numbers attached to the received data packets.

According to another aspect of the present invention there is provided a data communication device for use in transferring data in forms of data packets among a plurality of data communication devices interconnected through a network, each data communication device comprising: a number issuing server unit for generating uniquely defined consecutive packet numbers, which is active at one data communication device among those data communication devices which are in communication state; a number issuing client unit for obtaining a packet number for each data packet to be transmitted at said each data communication device, from said one data communication device; a transmission unit for transmitting each data packet at said each data communication device by attaching a corresponding packet number obtained by the number issuing client unit to each data packet; a reception unit for receiving data packets at said each data communication device; and a processing unit for processing received data packets at said each data communication device in an order of packet numbers attached to the received data packets.

Other features and advantages of the present invention will become apparent from the following description taken in conjunction with the accompanying drawings.

DETAILED DESCRIPTION OF THE PREFERRED EMBODIMENTS

Referring now to FIG. 4 to FIG. 9, one embodiment of a scheme for data transfer among data communication devices according to the present invention will be described in detail.

Figure 1:
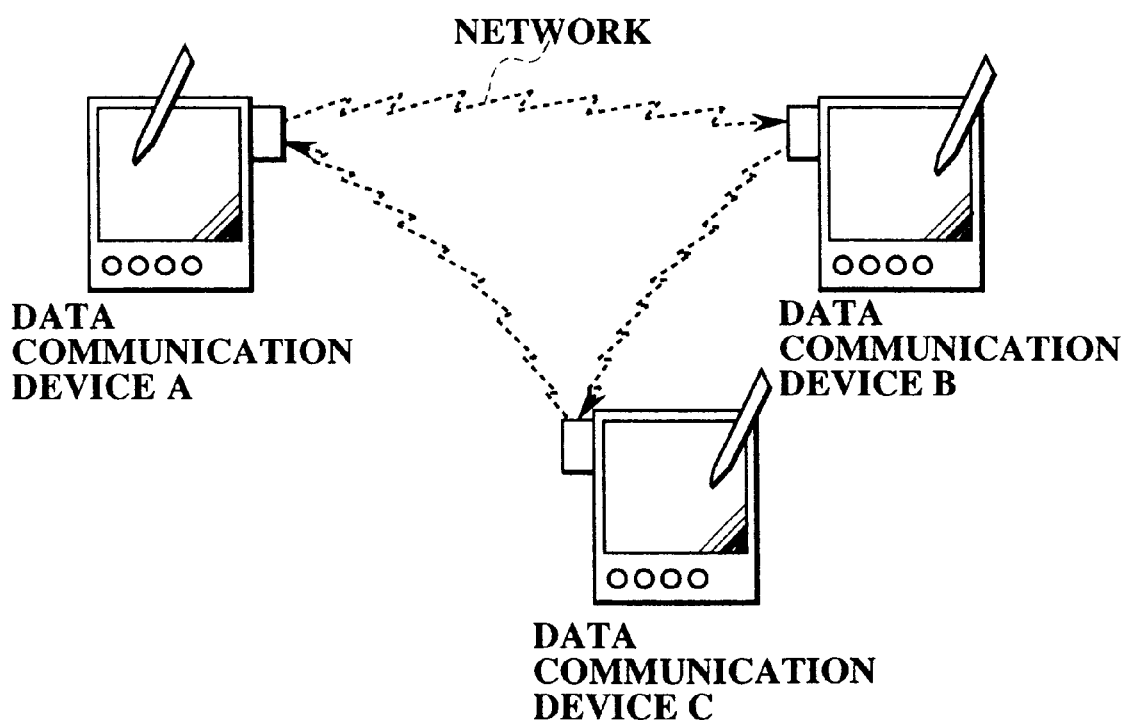
FIG. 1 is a schematic block diagram of a conventional network system.
Figure 2A:
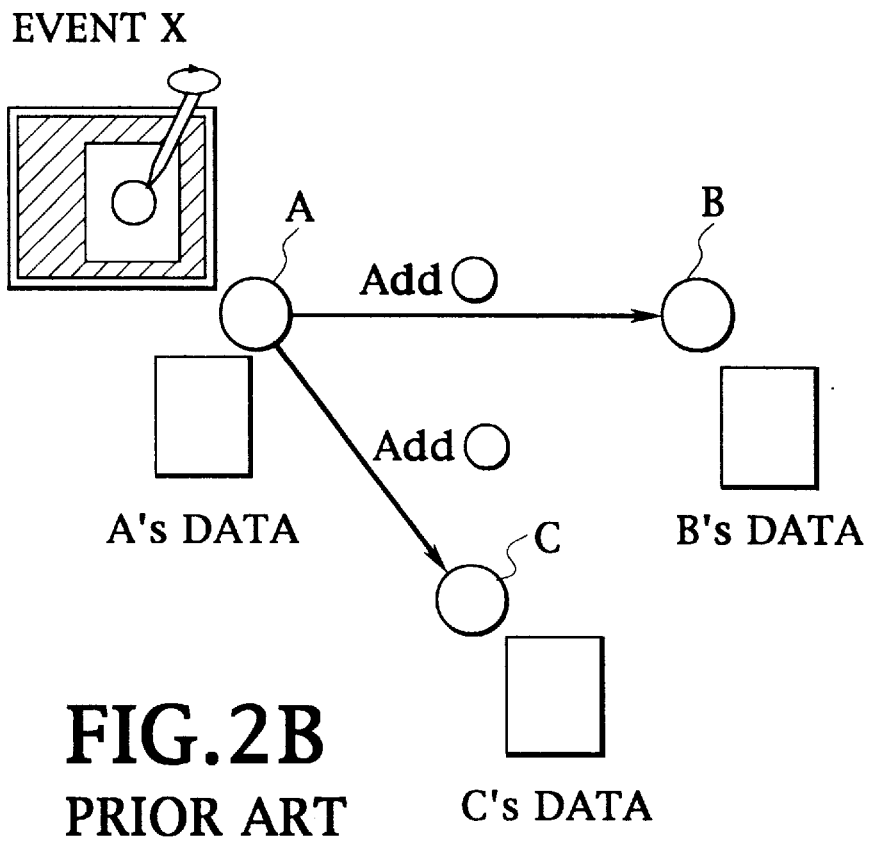
FIGS. 2A and 2B are diagrams illustrating an exemplary data updating operation in the network system of FIG. 1.
Figure 2B:
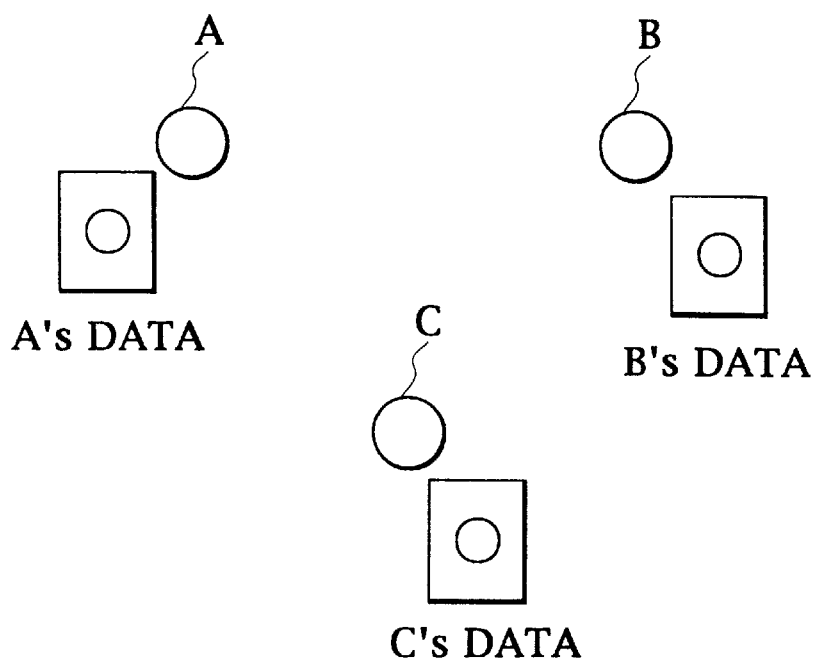
Figure 3A:
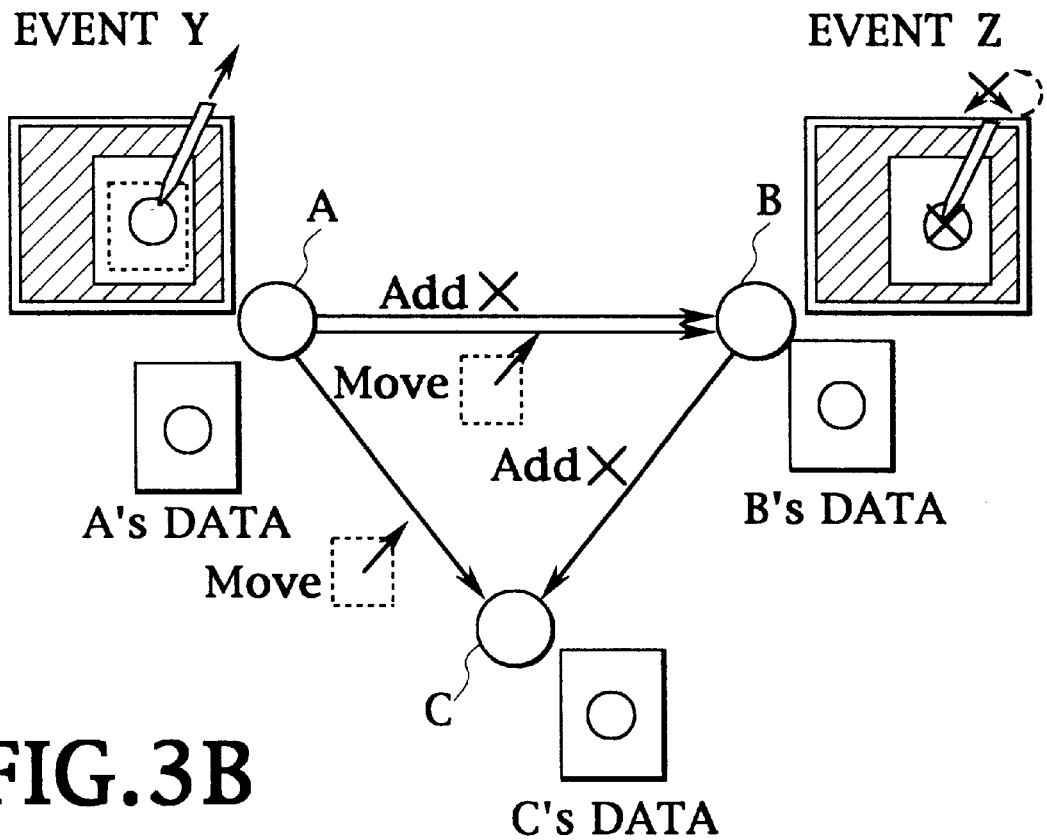
FIGS. 3A and 3B are diagrams illustrating a problem arising in an exemplary data updating operation in the network system of FIG. 1.
Figure 3B:
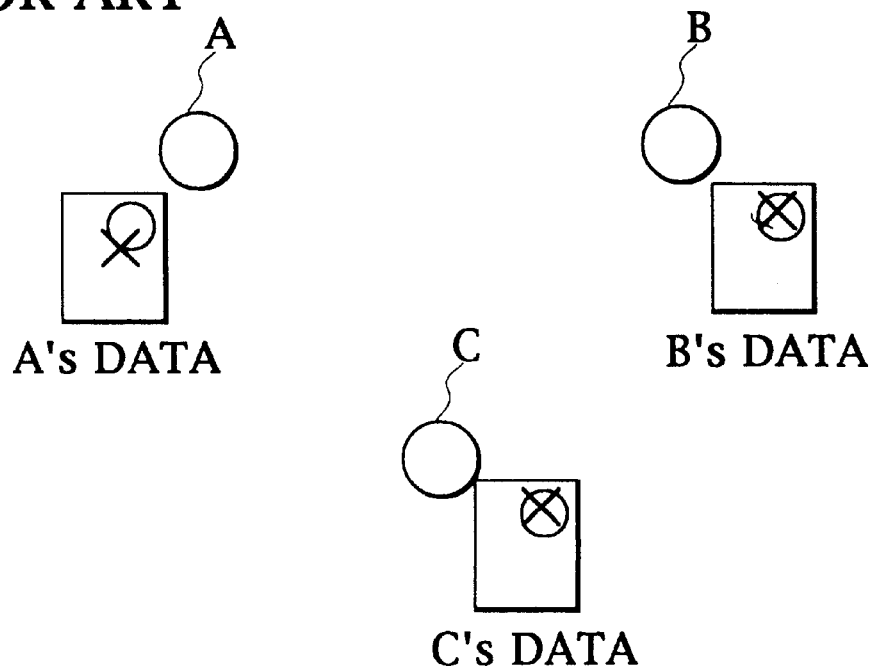
Figure 4:
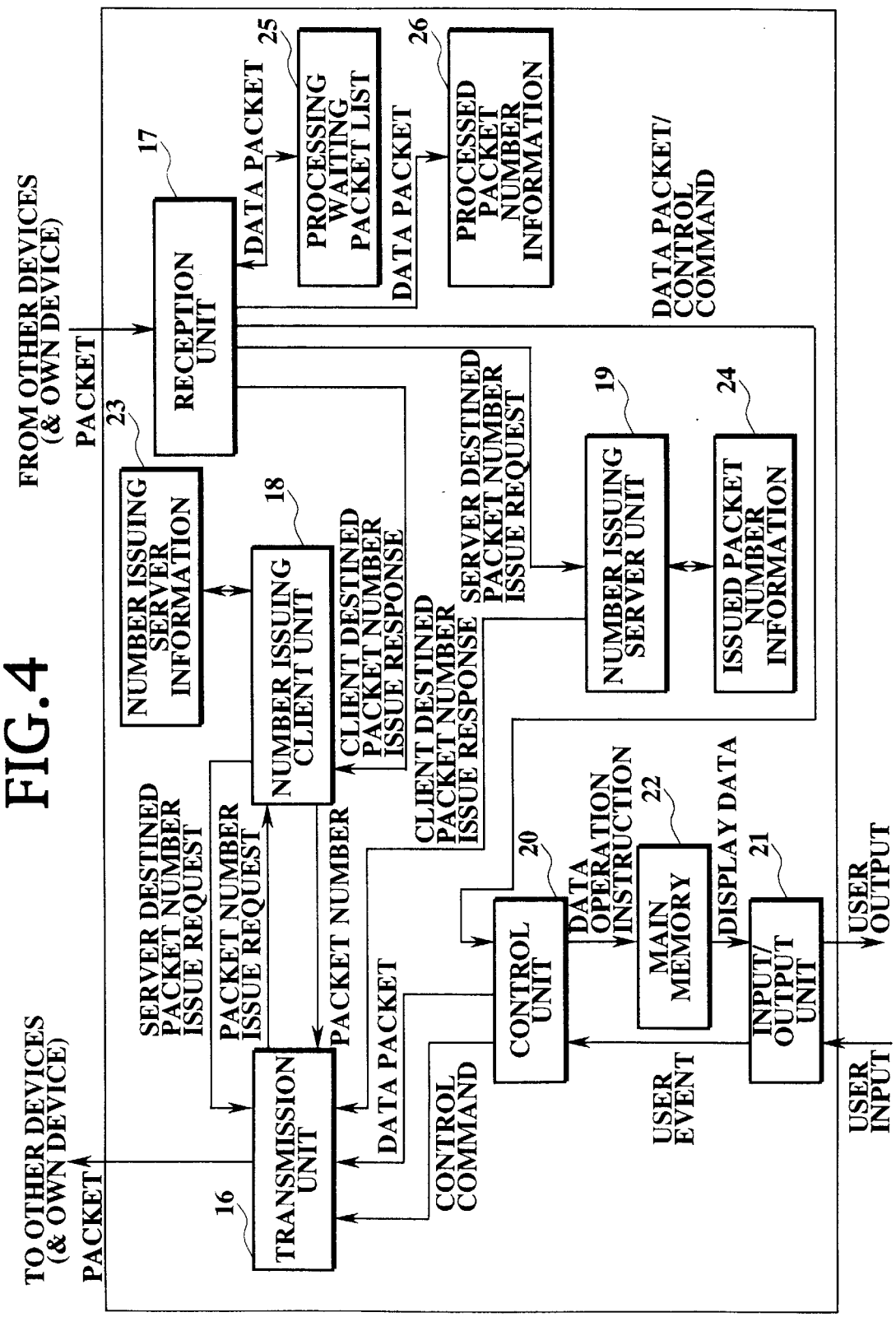
FIG. 4 is a block diagram of each data communication device for realizing a data transfer scheme according to the present invention.

FIG. 4 shows each data communication device for realizing the data transfer scheme of the present invention, which comprises a transmission unit 16, a reception unit 17, a number issuing server unit 19, a number issuing client unit 18, a control unit 20, an input/output unit 21, a main memory 22, a packet number server information 23, an issued packet number information 24, a processing waiting packet list 25, and a processed packet number information 26.

The input/output unit 21 receives an input from a user, and sends the received input to the control unit 20 as a user event. The input/output unit 21 also displays data stored in the main memory 22 on a display screen, so as to provide means by which the user can refer to the data stored in the main memory 22.

The control unit 20 carries out an overall control of this data communication device as well as a communication control with respect to the other data communication devices, and sends control commands with respect to the other data communication devices to the transmission unit 16. Also, the control unit 20 updates the data stored in the main memory 22 according to instructions indicated by control commands and events sent from the reception unit 17. In addition, the control unit 20 generates data packets from those user events sent from the input/output unit 21 which are related to modifications on the data stored in the main memory 22, and sends the generated data packets to the transmission unit 16 in order to transmit these data packets to the own device and the other devices.

The transmission unit 16 receives (1) the data packets and the control commands from the control unit 20, (2) a server destined packet number issue request and a packet number from the number issuing client unit 18, and (3) a client destined packet number issue response from the number issuing server unit 19.

When a data packet is received, the transmission unit 16 sends a packet number issue request for requesting an issuance of a packet number for this data packet to the number issuing client unit 18, and awaits for a packet number from the number issuing client unit 18. When a control command is received, the transmission unit 16 transmits this control command to its target devices. When a packet number is received, the transmission unit 16 generates a header based on this packet number for a data packet in a waiting state which corresponds to this packet number, attaches the generated header to that data packet, and transmits that data packet to its target devices including the own device.

When a server destined packet number issue request is received, the transmission unit 16 transmits this server destined packet number issue request to its destination device, that is, the device in which the number issuing server unit 19 is active among a plurality of devices currently in communication, which is indicated by the number issuing server information 23. When a client destined packet number issue response is received, the transmission unit 16 transmits this client destined packet number issue response to its destination device, that is, the device which is a source of the corresponding server destined packet number issue request.

The reception unit 17 receives packets from the own device and the other devices. When the received packet is a data packet, the reception unit 17 compares the packet number of this data packet with the processed packet number information 26, and when this packet number is consecutive to the processed packet number indicated by the processed packet number information 26, this data packet is sent to the control unit 20 while the processed packet number information 26 is updated. Otherwise, the reception unit 17 stores this data packet into the processing waiting packet list 25.

When the received packet is a control command, the reception unit 17 sends this control command to the control unit 20. When the received packet is a server destined packet number issue request, the reception unit 17 sends this server destined packet number issue request to the number issuing server unit 19. When the received packet is a client destined packet number issue response, the reception unit 17 sends this client destined packet number issue response to the number issuing client unit 18.

Then, when there is a data packet among the data packets in the processing waiting packet list 25 whose packet number is consecutive to the processed packet number indicated by the processed packet number information 26, the reception unit 17 removes this data packet from the processing waiting packet list 25 and sends this data packet to the control unit 20, while updating the processed packet number information 26. This operation is repeated until there is no more data packet to which this operation applies.

When a packet number issue request is received from the transmission unit 16, the number issuing client unit 18 refers to the number issuing server information 23 which indicates an information on a device in which the number issuing server unit 19 is active, generates a server destined packet number issue request for that device in which the number issuing server unit 19 is active, and sends the generated server destined packet number issue request to the transmission unit 16. When a client destined packet number issue response is received from the reception unit 17, the number issuing client unit 18 sends a packet number indicated by this client destined packet number issue response to the transmission unit 16.

When a server destined packet number issue request is received from the reception unit 17, the number issuing server unit 19 refers to the issued packet number information 24, generates a packet number which is consecutive to the issued packet number indicated by the issued packet number information 24, generates a client destined packet number issue response based on the generated packet number, and sends the generated client destined packet number issue response to the transmission unit 16 while updating the issued packet number information 24.

The main memory 22 stored data which are to be maintained in identical contents among the data communication devices.

The packet number can be set in any desired format according to the purpose. For example, the packet number for the 1234-th packet in a communication under a communication title "aiueo" can be expressed as "aiueo-1234". The packet number is uniquely assigned, and no two packet numbers are the same within a sufficient period of time.

When a packet number of a packet-B is issued later than and immediately after a packet number of a packet-A, the packet-B is said to be consecutive to the packet-A. For example, When the packet-A has a packet number "aiueo-1234", the packet-B consecutive to the packet-A should have a packet number "aiueo-1235".

The packet number issue request indicates that an issuance of a packet number for a data packet is requested. Each data packet is distinguished from the other data packets by a packet identifier which is different from the packet number.

The server destined packet number issue request indicates that it is relaying a packet number issue request to the number issuing server unit 19 from the number issuing client unit 18. This server destined packet number issue request contains an information to be utilized by a destination number issuing server unit 19, which indicates a source data communication device of a source number issuing client unit 18 from which this server destined packet number issue request originates.

The client destined packet number issue response indicates that it is a response to a request source number issuing client unit 18 from the number issuing server unit 19, in response to the server destined packet number issue request corresponding to this client destined packet number issue response. Here, a device having a destination number issuing client unit 18 of this client destined packet number issue response is obtained from the corresponding server destined packet number issue request.

The issued packet number information 24 indicates the issued packet number which is the latest value among the packet numbers issued by the number issuing server unit 19 up to that point.

The processed packet number information 26 indicates the processed packet number which is the latest value among the packet numbers of the data packets which were sent from the reception unit 17 to the control unit 20 up to that point.

The processing waiting packet list 25 stores those data packets whose packet numbers are subsequent to the processed packet number but not consecutive to the processed packet number.

The number issuing server information 23 indicates an information on a data communication device in which the number issuing server unit 19 is active.

Each data communication device carries out communications by transmitting and receiving packets. The packets are classified into the data packets and the control packets according to their intended uses. The control packet is a packet necessary in executing and realizing a communication, while the data packet is a packet for storing intended data exchange contents in a communication.

The ordering of the packet order used in the present invention applies only to the data packets and not to the control packets. This is partly because the control packets are to be used in carrying out communications among the devices for the purpose of executing the packet number issue request or response so that the packet order control on the control packets would result in a self-contradiction, and partly also because there is no need to apply the same packet order control as applied to the data packets. The request and response sent by the number issuing server unit 19 and the number issuing client unit 18 through the transmission unit 16 and the reception unit 17 are belonging to the control packets, so that the packets for these request and response themselves are not handled by attaching packet numbers and processed according to an order indicated by the attached packet numbers. The server destined packet number issue request is also classified into the control packets, but it is treated separately from the other control packets as it plays a characteristic role in the present invention.

As shown in FIG. 4, an event due to the user input such as that for updating data is transmitted toward the own device and the other devices by the transmission unit 16 as a data packet, and received by the reception unit 17. Then, after the corresponding data in the main memory 22 is updated via the control unit 20, the updated data is presented to the user via the input/output unit 21. Note here that the event due to the user input does not directly update the data in the main memory 22 of the own device. This feature is required in order to process all the events at all the devices including the events at the own device in a unique order according to the packet numbers given by the number issuing client unit 18 and the number issuing server unit 19.

The data transfer scheme of the present invention comprises a transmission routine, a reception routing, a number issuing client routing, and a number issuing server routine.

The transmission routing comprises: a step for converting an event due to a user input or an event occurred internally in the device into a data packet; a step for requesting a generation of a packet number corresponding to that data packet to the number issuing client routine; a step for waiting a response from the number issuing client routine; a step for generating a header from a packet number issued by the number issuing client routine and a supplementary information, and attaching the generated header to the data packet; and a step for transmitting the data packet.

The reception routine comprises: a step for extracting the header from the received data packet; a step for processing the data packet and updating the processed packet number when the packet number in the extracted header is consecutive to the processed packet number, or storing the received data packet into the processing waiting packet list 25 otherwise; and a step for sequentially processing each data packet in the processing waiting packet list 25 which is consecutive to the processed packet number.

The number issuing client routine comprises: a step for requesting an issuance of a packet number corresponding to a data packet to the number issuing server routine of the other device through the transmission unit 16; a step for waiting an issuance of a packet number in response to the request by the number issuing server routine; and a step for receiving a packet number in response to the request from the number issuing server routine through the reception unit 17, and sends the received packet number to the request source transmission routine.

The number issuing server routine comprises: a step for receiving a packet number issue request from the number issuing client routine through the reception unit 17; a step for issuing a new packet number which is consecutive to the issued packet number indicated by the issued packet number information 24 in response to the packet number issue request; and a step for sending the issued packet number to the request source number issuing client routine through the transmission unit 16 while updating the issued packet number indicated by the issued packet number information 24 to the issued packet number.

Each routine is owned by each device in communication state, where the transmission routine, the reception routine, and the number issuing client routine are executed in each device, but the number issuing server routine is executed in one particular device alone. The number issuing client routine of each device knows this one particular device in which the number issuing server routine is active, so that an issuance of a packet number can be requested to the number issuing server routing which is active in that one particular device.

The data transfer scheme of the present invention can be realized in a form of a data transfer program, which is to be stored in the main memory 22 and executed by the control unit 20. This data transfer program can be stored on a storage medium in a state which is executable at arbitrary data communication device, and distributed to the data communication devices. Then, by using an external memory input/output means provided in each data communication device, this data transfer program can be loaded into the main memory 22, stored therein, and executed by the control unit 20.

Now, the operation in each of the above described routines of the data transfer scheme according to the present invention will be described.

First, the operation in the transmission routine is as follows.

When an event due to a user input or an internal of the device occurs at some data communication device, data to be transmitted to the other data communication devices is generated according to this event. This data is then converted into a data packet, and an identifier for distinguishing this data packet from the other packets is generated. Here, this identifier is generated inside this device, and this identifier does not specify the order of the packet in the communications with the other data communication devices. Then, an issuance of a packet number for this packet is requested to the number issuing client routine, and a response is awaited. When a packet number for this packet is returned from the number issuing client routine, a header is generated by combining this packet number with the identifier and the other supplementary information, and this header is attached to this data packet, and then this data packet is transmitted to the correspondent devices including the own device.

By this operation of the transmission routine, an event occurred at some data communication device can be converted into a packet, and this packet can be transmitted by attaching a packet number which is unique and consecutive during the session.

Next, the operation in the reception routine is as follows.

First, after a start of the communication, when a data packet arrives for the first time from the other device or the own device, this data packet is processed, and the packet number of this data packet is held as the processed packet number. When a next data packet arrives from the other device or the own device, the packet number of this data packet is referred, and when this packet number is subsequent and consecutive to the processed packet number, this data packet is processed straightforwardly and the processed packet number is updated. On the other hand, when this packet number is subsequent but not consecutive to the processed packet number, this data packet is added to the processing waiting packet list 25. When this packet number is not subsequent to the processed packet number, this data packet is discarded. In this manner, only those packets which are consecutive to the already processed packets will be processed, while the processing on the other packets is suspended.

Also, upon referring to the processing waiting packet list 25, when there exists a data packet which has a packet number which is subsequent and consecutive to the processed packet number, this data packet is processed while the processed packet number information 26 is updated. This operation is repeated until no such data packet is extant. In this manner, the data packet in the waiting state is processed when a condition for processing it in a proper consecutive order is satisfied.

By this operation of the reception routine, it becomes possible to process the data packets in an order indicated by their packet numbers.

Next, the operation in the number issuing client routing is as follows.

The number issuing client routine first learns one particular data communication device in which the number issuing server routine is active. Then, when the packet number issue request is received from the transmission routine on the own device, this packet number issue request is relayed to the number issuing server routine and a response from the number issuing server routine is awaited. When a response from the number issuing server routine, that is, a packet number is received, this packet number is returned to the request source transmission routine.

Next, the operation in the number issuing server routing is as follows.

The number issuing server routine first initializes the issued packet number information 24. Then, when the packet number issue request is received from the number issuing client routing, the issued packet number is referred, and a new packet number which is consecutive to the issued packet number is generated. Then, this new packet number is returned to the number issuing client routine, while the issued packet number is updated to this new packet number.

By this operation of the number issuing server routine, the packet number issue requests from all the data communication devices can be centrally handled by the number issuing server routine through the respective number issuing client routines, and it becomes possible to issue unique and consecutive packet numbers.

Figure 5:
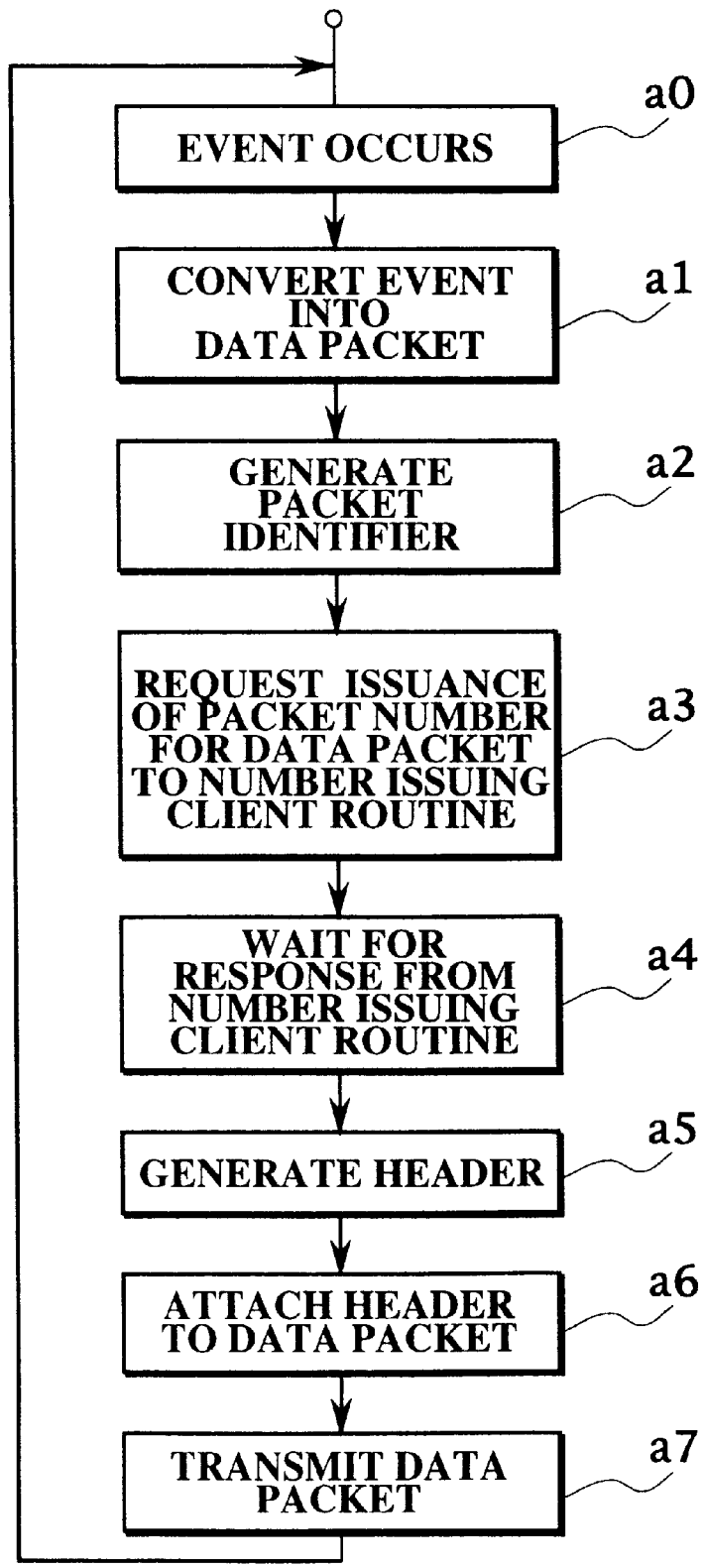
FIG. 5 is a flow chart of an operation procedure for a transmission routine to be executed in the data communication device of FIG. 4.
Figure 6:
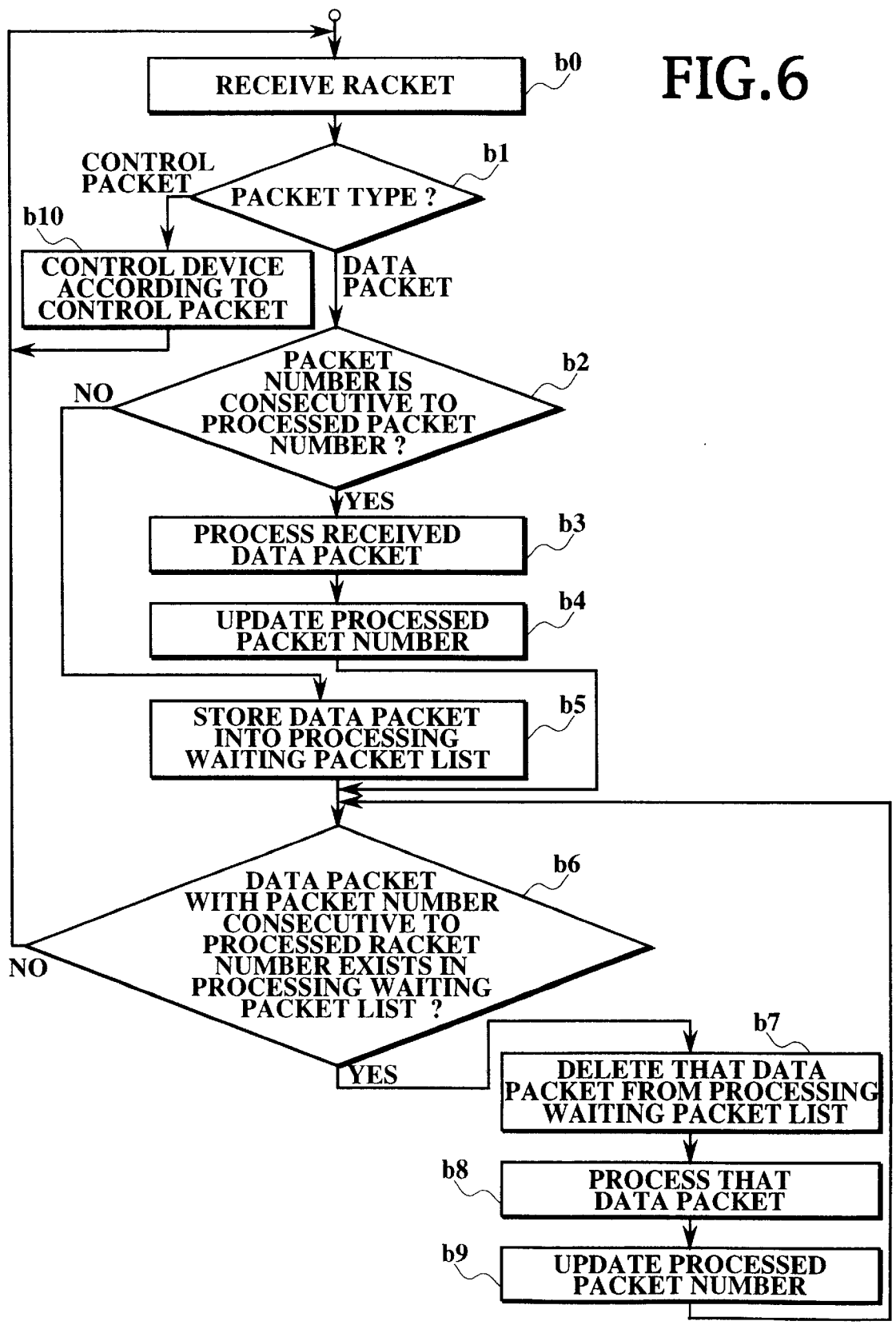
FIG. 6 is a flow chart of an operation procedure for a reception routine to be executed in the data communication device of FIG. 4.
Figure 7:
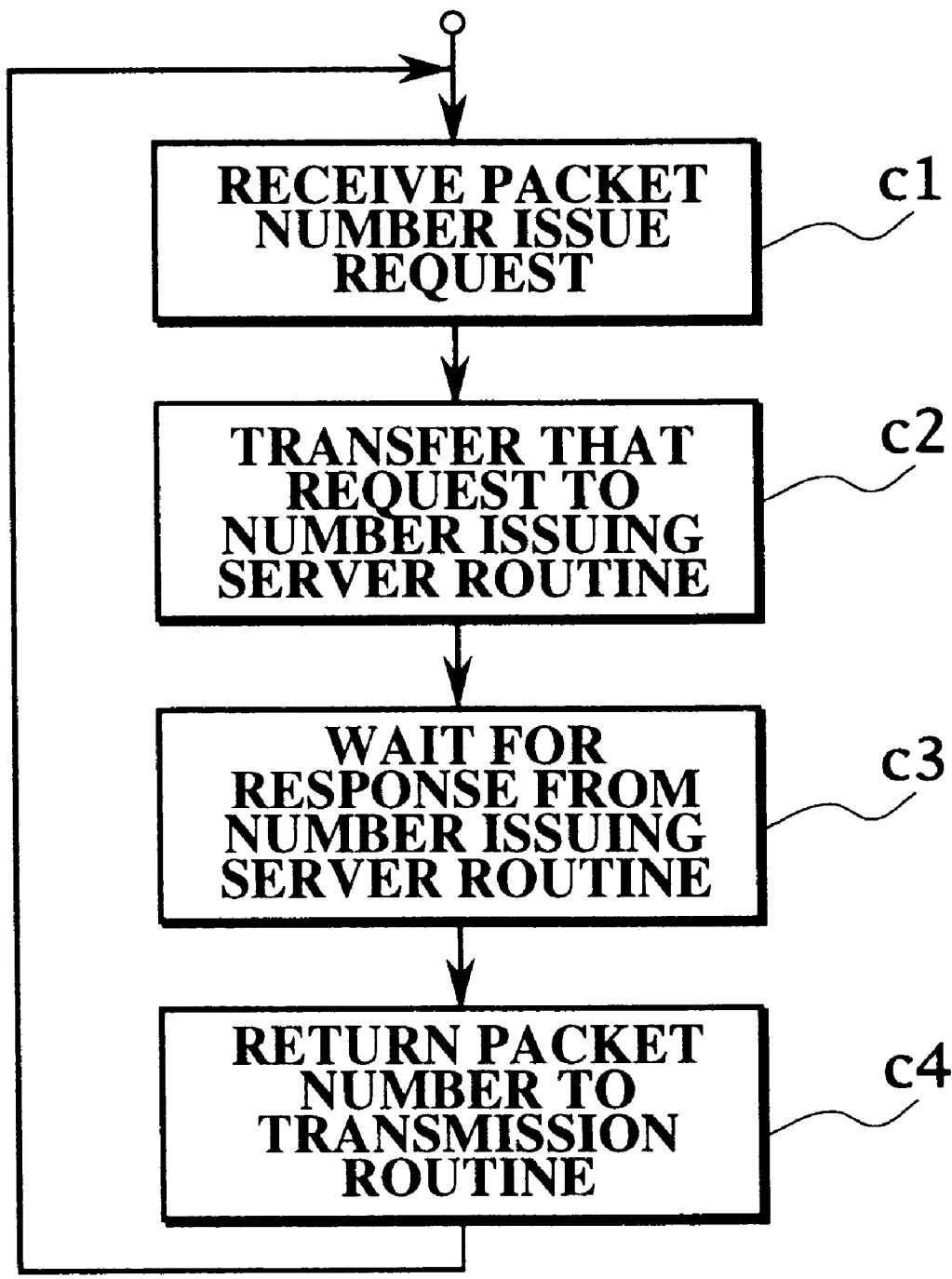
FIG. 7 is a flow chart of an operation procedure for a number issuing client routine to be executed in the data communication device of FIG. 4.
Figure 8:
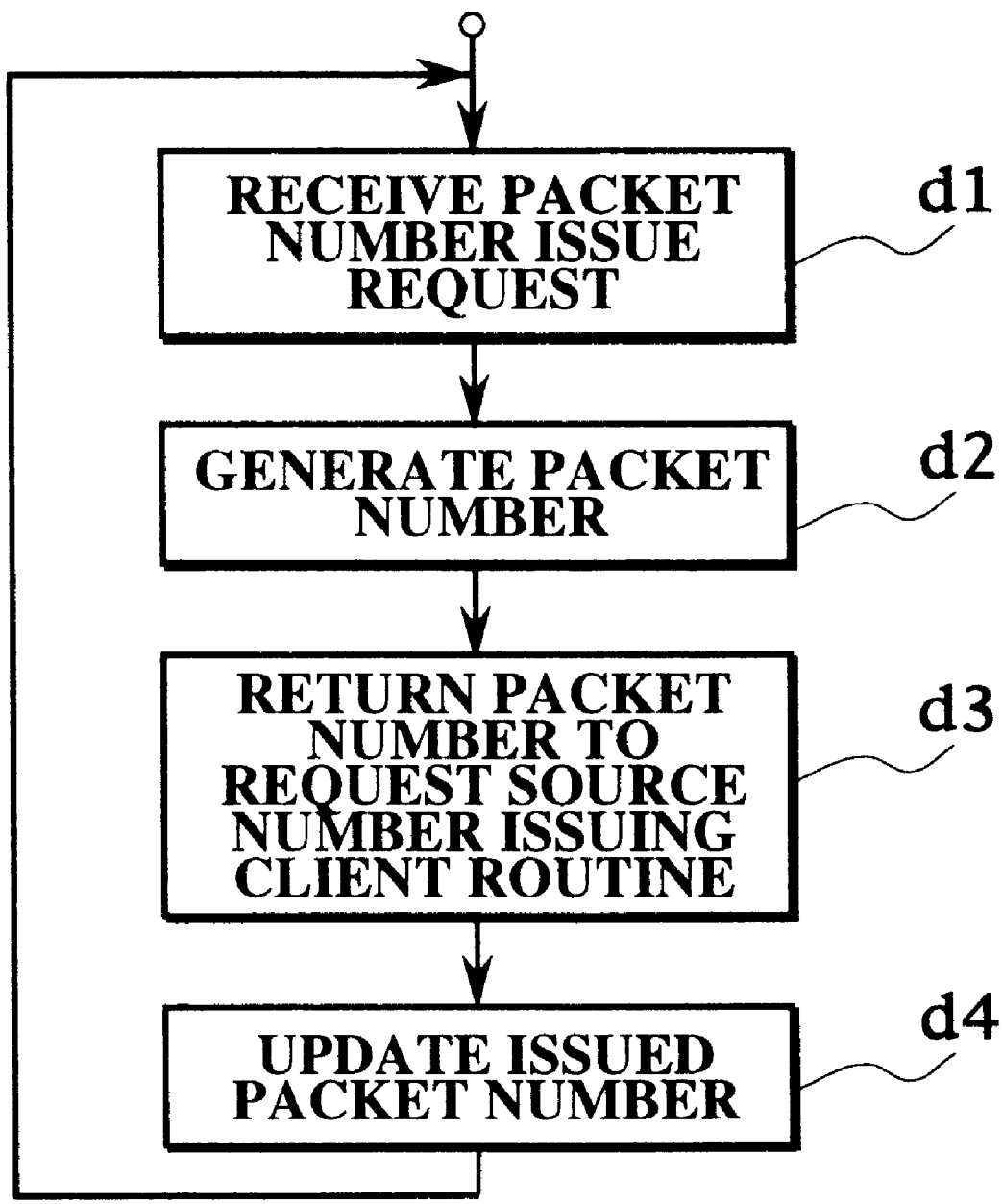
FIG. 8 is a flow chart of an operation procedure for a number issuing server routine to be executed in the data communication device of FIG. 4.

Now, with references to the flow charts of FIG. 5 to FIG. 8, the specific operation procedures for the data communication device in the data transfer scheme according to the present invention will be described in detail. Here, FIG. 5 shows the operation procedure for the transmission routine, FIG. 6 shows the operation procedure for the reception routine, FIG. 7 shows the operation procedure for the number issuing client routine, and FIG. 8 shows the operation procedure for the number issuing server routine. These four routines are to be executed in parallel while the data communication device of FIG. 4 is operating.

First, the operation procedure for the transmission routine as shown in FIG. 5 is as follows.

(step a0) Some event which requires mutual data exchange among the devices occurs.

(step a1) That event is converted into a data packet.

(step a2) A packet identifier is generated. Here, the packet identifier can be generated in various formats by various methods. For example, the packet identifier can be generated as "a device ID of this device+a serial number for (all) packet transmission from this device", or as "a device ID of this device +a current time at this device". For instance, when the former format is employed, a packet identifier of the 2277392-th packet in total from the device with a device ID "8877" will be given by "8877- 2277392".

(step a3) An issuance of a packet number corresponding to that packet identifier is requested to the number issuing client routine.

(step a4) A response from the number issuing client routine for that request is awaited.

(step a5) A header is generated from the packet identifier, the packet number, and the other supplementary information.

(step a6) The header is attached to that data packet.

(step a7) That data packet is transmitted toward the other devices and the own device. The operation then returns to the step a0.

Note that, instead of carrying out the steps a1 to a6 sequentially as described above, it is also possible to divide these steps into some groups of steps and execute these groups of steps in parallel.

Next, the operation procedure for the reception routine as shown in FIG. 6 is as follows.

(step b0) A packet transmitted from the other device or the own device is received.

(step b1) The received packet is classified as either a data packer or a control packet. When the received packet is a data packet, the operation proceeds to the step b2. When the received packet is a control packet, the operation proceeds to the step b10.

(step b2) (a case of a data packet) A packet number of the received data packet is compared with the processed packet number, and whether this packet number is consecutive to the processed packet number or not is judged. If so, the operation proceeds to the step b3. If not, the operation proceeds to the step b5.

(step b3) A content of the received data packet is processed.

(step b4) The processed packet number is updated to the packet number of the received data packet. Then, the operation proceeds to the step b6.

(step b5) The received data packet is stored into the processing waiting packet list.

(step b6) Whether a data packet with a packet number which is consecutive to the processed packet number exists in the processing waiting packet list or not is judged. If so, the operation proceeds to the step b7. If not, the operation returns to the step b0.

(step b7) That data packet found at the step b6 is deleted from the processing waiting packet list.

(step b8) A content of that data packet found at the step b6 is processed.

(step b9) The processed packet number is updated to the packet number of that data packet processed at the step b8. Then, the operation returns to the step b8.

(step b10) (a case of a control packet) The data communication device is controlled according to a control command indicated by the received control packet. Then, the operation returns to the step b0.

By this operation, the data packets with consecutive packet numbers are sequentially processed as they arrive while the data packets which non-consecutive packet numbers are set in a waiting state, and then subsequently processed as their packet numbers become consecutive. In this manner, the arrived data packets can be processed in the packet number order according to their packet numbers.

At a start of the communication, there is a need to acquire the processed packet number, and a method for acquiring this processed packet number is defined separately from this reception routine. Here, the various methods for acquiring the processed packet number are available. For example, the method for acquiring the processed packet number can be (1) a method in which the data packet received for the first time after a start of the communication is processed, and a packet number of this packet is set as an initial processed packet number, or (2) a method in which the processed packet number is handed as a part of a procedure for establishing the communication at a start of the communication.

Next, the operation procedure for the number issuing client routine as shown in FIG. 7 is as follows.

(step c1) A packet number issue request corresponding to some packet identifier is received from the transmission routine.

(step c2) That request is transferred to the number issuing server routine through the transmission unit 16.

(step c3) A response from the number issuing server routine through the reception unit 17 is awaited.

(step c4) After waiting for a prescribed period of time, if there is no response, it is regarded as an error and a error notice is returned to the request source transmission routine. when a response from the number issuing server routine is received, a packet number corresponding to that some packet identifier as indicated by that response is returned to the request source transmission routine. The operation then returns to the step c1.

Next, the operation procedure for the number issuing server routine as shown in FIG. 8 is as follows.

(step d1) A packet number issue request corresponding to some packet identifier is received from the number issuing client routine through the reception unit 17.

(step d2) In response to that request, a new packet number which is consecutive to the issued packet number is generated.

(step d3) The generated new packet number is returned to the request source number issuing client routine.

(step d4) The issued packet number is updated to the generated new packet number. The operation then returns to the step d1.

Note that, in this data transfer scheme according to the present invention, the number issuing server routine is owned by every data communication device, but is operated only at one data communication device among the data communication devices in communication state. This feature is employed in order to avoid a confusion in the communication which would result when more than one number issuing server routines are operated simultaneously and packet numbers are issued independently by each of these more than one number issuing server routines.

There are various methods available for setting only one data communication device in which the number issuing server routine is to be operated. For example, it is possible to guarantee that the number issuing server routine is active only in one data communication device by (1) a method in which the number issuing server routine is operated at a device which declared the number issuing server routing activation first in the procedure for establishing the communication which takes place at a start of the communication, or (2) a method in which the number issuing server routine is operated at a device which requested a start of the communication first, or else (3) a method in which, when a request for a start of the communication is made by a new device while the number issuing server routine is already active, an information on a device in which the number issuing server routine is active is notified to that new device.

When the number issuing server itself stops its operation, there is a need to newly activate the number issuing server routine at another device, and this can be realized by the following method, for example. Namely, when some device requests an issuance of a packet number and receives an error notice due to a time-out or an absence of the number issuing server routine in response, then this device itself activates the number issuing server routine and notifies this fact to the other data communication devices.

Also, when the number issuing server routine is active at more than one devices for some reason and the packet numbers are issued confusingly, it is possible to resolve this confused state by resetting the number issuing server routines at all of these more than one devices (by issuing the server stopping signals, for example), so as to create the above described state in which the number issuing server routine is absent. Then, the number issuing server routine can be activated at only one device according to the above described method.

Now, an exemplary operation in the data transfer scheme according to the present invention will be described with reference to FIG. 9.

Figure 9:
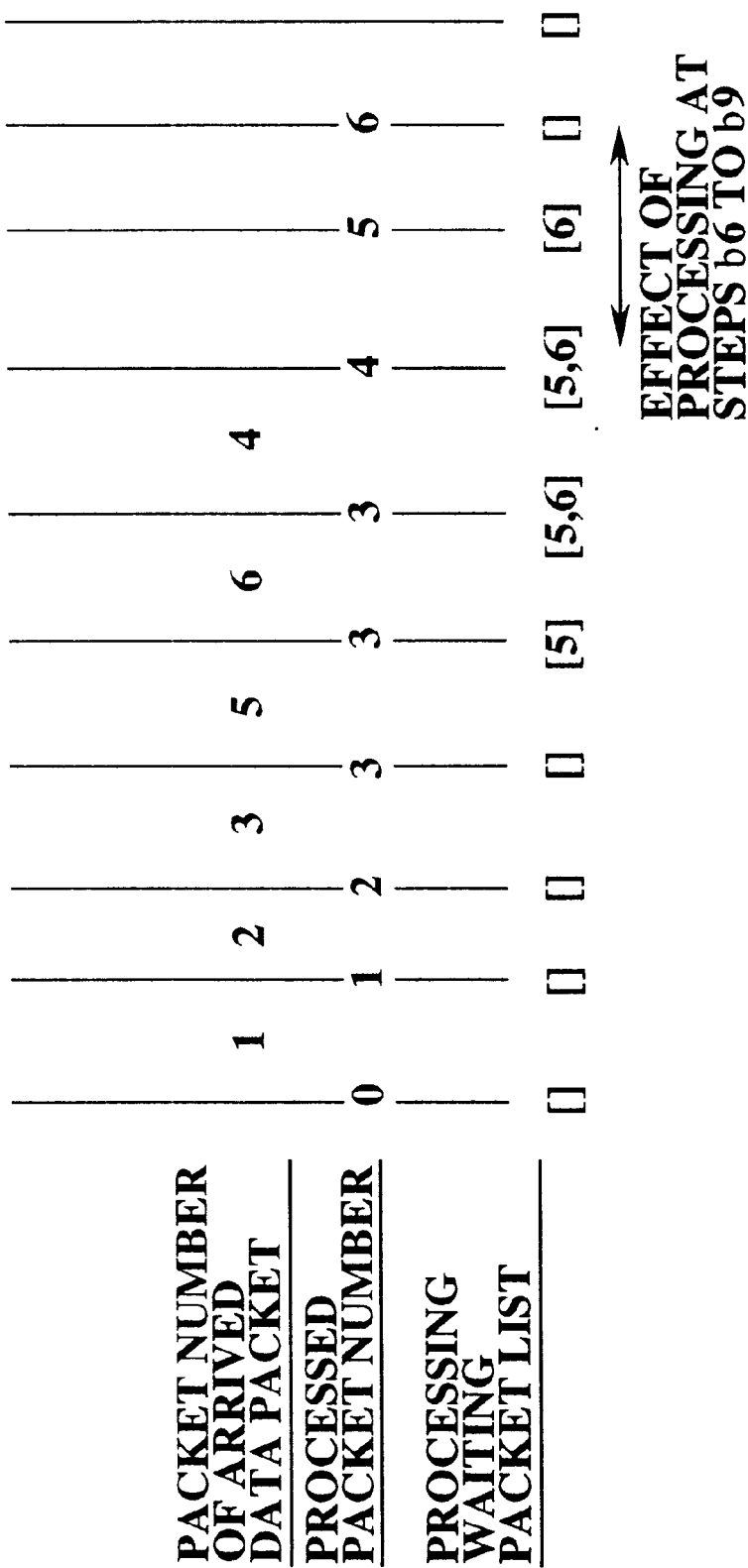
FIG. 9 is a timing chart illustrating an exemplary operation result obtained by the data communication device of FIG. 4.

FIG. 9 shows states of the processed packet number and the processing waiting packet list during the progress of the reception routine processing, in an exemplary case where the packets with the packet numbers "1", "2", "3", "5", "6", and "4" arrived in this order. As indicated in FIG. 9, while the packets with the consecutive packet numbers arrive, the arrived packets are processed immediately, and even when packets with non-consecutive packet numbers arrive, the packets are processed in a correct packet number order by the ordering processing at the steps b6 to b9 described above.

Now, several possible modifications to the above described data transfer scheme according to the present invention will be described.

(1) In the above, the number issuing server routine is set to be active only on one data communication device among the data communication devices in communication state. When this scheme is applied to a case of establishing a plurality of communication channels among the data communication devices in communication state, a single number issuing server routine is going to be operating for these plurality of communication channels.

In such a case, the order of data packets to be exchanged in each of these plurality of communication channels is to be processed by a single number issuing server routine, so that there arises a problem in that the the data packet order in one communication channel is affected by the presence of data packets in the other communication channels which are unrelated to that one communication channel. This implies that a state of each communication channel is going to be affected by states of the other communication channels, which is against the basic requirement on the communication channel that it should not be obstructed by the other communications.

In this regard, it is also possible to modify the above scheme such that the number issuing server routine is set to be active only on one data communication device for each communication channel, and therefore more than one number issuing server routines are set to be simultaneously active in correspondence to more than one communication channels. In such a modified embodiment, the number issuing server information to be referred by the number issuing client routine has an information on a data communication device in which the number issuing server routine is active, stored in correspondence to each communication channel, and the umber issuing client routine on each data communication device transmits the server destined packet number issue request for each communication channel by switching the request target data communication device by referring to such a number issuing server information.

In this manner, the above noted problem concerning the dependency of each communication channel on the other communication channels can be resolved, and the number issuing server routines for a plurality of communication channels can be distributed (although it is also possible to have more than one number issuing server routines for more than one communication channels active on one and the same data communication device), so that it is possible to avoid concentrating the processing load to a particular data communication device.

(2) When a certain data packet is not received continuously over a prescribed period of time, that is, when a state in which the received data packets are not processed but stored into the processing waiting packet list continues over a prescribed period of time, it is possible to request a re-transmission of that certain data packet to the number issuing server routine. In this case, at the number issuing server routine, each data packet transmitted from the device which is corresponding to each packet number issued by this number issuing server routine is stored upon receiving it, and the stored data packet is transmitted in response to the re-transmission request.

(3) The issuance of the packet number by the number issuing server routine can be notified not only to the request source device but also to all the devices in communication state. In this case, each device stores a state of packet number issuance, and in a case of requesting a re-transmission of a data packet, each device requests the re-transmission to the request source device corresponding to the packet number of that data packet to be re-transmitted rather than to the number issuing server routine, according to the stored packet number issuance state.

(4) When a data packet corresponding to an already issued packet number is not transmitted or received over a prescribed period of time, the number issuing server routine can judge that this packet number was already issued but a corresponding data packet was not actually transmitted, and transmit an invalid data packet without any data content in correspondence to that already issued packet number. In this manner, even when there exists a problematic device which already acquired the packet number but does not appear to transmit the data packet corresponding to that packet number, it is possible to prevent such a problematic device from affecting the reception processing of the other normal device. In addition, when the data packet corresponding to that already issued packet number is belatedly transmitted from the problematic device after the invalid data packet is transmitted, such a belated data packet can be handled as already processed one at each device, so as not to cause any confusion.

(5) In conjunction with the modification (3) described above, when a data packet corresponding to an already issued packet number is not transmitted or received over a prescribed period of time, the reception routine on each data communication device can continue the communication by updating the processed packet number so as to ignore the existence of that missing data packet. In this manner, it is possible to secure the continuity of the communication by sacrificing the continuity of data within a certain limit.

As described, according to the data transfer scheme according to the present invention, data to be exchanged among the data communication devices interconnected through a network are processed while maintaining the data order uniquely, so that the data contents can be maintained to be identical in the resulting processed data. Moreover, in a normal communication state, that is, in a case of having no discontinuity in the order of data to be exchanged, the processing load on the receiving side can be reduced. Furthermore, even when there is a discontinuity in the order of data to be exchanged, the uniquely defined packet number is attached to the packet itself, so that it is possible to deal with such a situation rather easily at each device.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for transferring data in forms of data packets among a plurality of data communication devices interconnected through a network, comprising the steps of:

generating uniquely defined consecutive packet numbers at one data communication device among those data communication devices which are in communication state;

obtaining a packet number for each data packet to be transmitted at each data communication device, from said one data communication device;

transmitting each data packet at each data communication device by attaching a corresponding packet number obtained at the obtaining step to each data packet;

receiving data packets at each data communication device; and processing received data packets at each data communication device in an order of packet numbers attached to the received data packets.

2. The method of claim 1, further comprising the steps of:

providing a number issuing server routine for generating a packet number corresponding to each data packet upon receiving a request, at each one of said plurality of data communication devices; and setting the number issuing server routine active only on said one data communication device, so that the packet numbers are generated at the generating step by the number issuing server routine on said one data communication device.

3. The method of claim 2, further comprising the step of:

providing a number issuing client routine for requesting an issuance of a packet number corresponding to each data packet to the number issuing server routine and receiving an issued packet number corresponding to each data packet from the number issuing server routine, at each one of said plurality of data communication devices, so that a packet number for each data packet is obtained at the obtaining step by the number issuing client routine on each data communication device.

4. The method of claim 1, further comprising the step of:

managing a processed packet number indicating a latest one of packet numbers of those data packets which have been processed by the processing step at each data communication device, by sequentially updating the processed packet number when a data packet is processed by the processing step at each data communication device.

5. The method of claim 4, further comprising the steps of:

judging whether a packet number of each received data packet is consecutive to the processed packet number at each data communication device, so that the processing step processes each received data packet when a packet number of each received data packet is judged as consecutive to the processed packet number; and storing a received data packet whose packet number is judged as not consecutive to the processed packet number at each data communication device, until a packet number of said received data packet becomes consecutive to the processed packet number.

6. The method of claim 1, further comprising the step of:

managing an issued packet number indicating a latest one of packet numbers generated by the generating step at said one data communication device, by sequentially updating the issued packet number when a packet number is generated by the generating step, so that the generating step sequentially generates a packet number which is consecutive to the issued packet number.

7. The method of claim 1, wherein the generating step generates a distinct series of uniquely defined consecutive packet numbers for each communication channel at a single data communication device among those data communication devices which are communicating through said each communication channel.

8. The method of claim 1, further comprising the steps of:

at said one data communication device, storing each data packet transmitted by each data communication device in correspondence to each packet number generated by said one data communication device;

requesting a re-transmission of a certain data packet from a certain data communication device to said one data communication device, when said certain data packet is not received at said certain data communication device over a prescribed period of time; and re-transmitting said certain data packet as stored by the storing step from said one data communication device, in response to a request made by said certain data communication device at the requesting step.

9. The method of claim 1, further comprising the steps of:

notifying an issuance of each packet number from said one data communication device to each data communication device;

at each data communication device, storing a state of packet number issuance by said one data communication device as notified by the notifying step;

requesting a re-transmission of a certain data packet from a certain data communication device to another data 7 communication device which obtained the packet number for said certain data packet at the obtaining step, according to the state of packet number issuance as stored by the storing step, when said certain data packet is not received at said certain data communication device over a prescribed period of time; and re-transmitting said certain data packet from said another data communication device, in response to a request made by said certain data communication device at the requesting step.

10. The method of claim 1, further comprising the step of:

transmitting an invalid data packet without any data content in correspondence to an already issued packet number from said one data communication device, when a data packet corresponding to said already issued packet number is not transmitted over a prescribed period of time.

11. A data communication device for use in transferring data in forms of data packets among a plurality of data communication devices interconnected through a network, each data communication device comprising:

a number issuing server unit for generating uniquely defined consecutive packet numbers, which is active at one data communication device among those data communication devices which are in communication state;

a number issuing client unit for obtaining a packet number for each data packet to be transmitted at said each data communication device, from said one data communication device;

a transmission unit for transmitting each data packet at said each data communication device by attaching a corresponding packet number obtained by the number issuing client unit to each data packet;

a reception unit for receiving data packets at said each data communication device; and a processing unit for processing received data packets at said each data communication device in an order of packet numbers attached to the received data packets.

12. The device of claim 11, wherein the number issuing server unit has a number issuing server routine for generating a packet number corresponding to each data packet upon receiving a request, and the number issuing server routine is set active only on said one data communication device, so that the packet numbers are generated by the number issuing server routine on said one data communication device.

13. The device of claim 12, wherein the number issuing client unit has a number issuing client routine for requesting an issuance of a packet number corresponding to each data packet to the number issuing server routine and receiving an issued packet number corresponding to each data packet from the number issuing server routine, so that a packet number for each data packet is obtained by the number issuing client routine on said each data communication device.

14. The device of claim 11, further comprising:

a memory for managing a processed packet number indicating a latest one of packet numbers of those data packets which have been processed by the processing unit at said each data communication device, by sequentially updating the processed packet number when a data packet is processed by the processing unit at said each data communication device.

15. The device of claim 14, further comprising:

a unit for judging whether a packet number of each received data packet is consecutive to the processed packet number at said each data communication device, so that the processing unit processes each received data packet when a packet number of each received data packet is judged as consecutive to the processed packet number; and a processing waiting packet list for storing a received data packet whose packet number is judged as not consecutive to the processed packet number at said each data communication device, until a packet number of said received data packet becomes consecutive to the processed packet number.

16. The device of claim 11, further comprising:

a memory for managing an issued packet number indicating a latest one of packet numbers generated by the number issuing server unit at said one data communication device, by sequentially updating the issued packet number when a packet number is generated by the number issuing server unit, so that the number issuing server unit sequentially generates a packet number which is consecutive to the issued packet number.

17. The device of claim 11, wherein the number issuing server unit generates a distinct series of uniquely defined consecutive packet numbers for each communication channel at a single data communication device among those data communication devices which are communicating through said each communication channel.

18. The method of claim 5, wherein the storing step only stores the received data packet whose number is judged as not consecutive to the processed packet number when the corresponding number of the received data packet is higher than the corresponding number of the processed data packet, and wherein, if the corresponding number of the received data packet is lower than the corresponding number of the processed data packet, the received data packet is discarded.

19. The device of claim 14, wherein, if the received data packet whose packet number is judged as not consecutive to the processed data is lower in number than the corresponding number of the processed data packet, the received data packet is discarded and is not stored.

20. The method of claim 1, wherein the obtaining step is performed by one and only one of the data communication devices interconnected through the network, and wherein the obtained packet number is globally valid for all of the data communication devices interconnected through the network.

* * * * *